(12) United States Patent
Dong et al.

(10) Patent No.: US 12,184,073 B2
(45) Date of Patent: Dec. 31, 2024

(54) ENERGY STORAGE SYSTEM, ON/OFF-GRID SWITCHING METHOD, AND POWER CONVERSION SYSTEM

(71) Applicant: Huawei Digital Power Technologies Co., Ltd., Shenzhen (CN)

(72) Inventors: Mingxuan Dong, Shanghai (CN); Yunfeng Liu, Shanghai (CN); Kai Xin, Shanghai (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/875,923

(22) Filed: Jul. 28, 2022

(65) Prior Publication Data

US 2023/0031139 A1 Feb. 2, 2023

(30) Foreign Application Priority Data

Jul. 30, 2021 (CN) .......................... 202110872541.3

(51) Int. Cl.
*H02J 3/32* (2006.01)
*H02J 3/38* (2006.01)
*H02J 7/00* (2006.01)

(52) U.S. Cl.
CPC ................ *H02J 3/32* (2013.01); *H02J 3/388* (2020.01); *H02J 7/007182* (2020.01); *H02J 2207/20* (2020.01)

(58) Field of Classification Search
CPC ........ H02J 3/32; H02J 3/388; H02J 7/007182; H02J 2207/20
See application file for complete search history.

(56) References Cited

U.S. PATENT DOCUMENTS

2017/0047862 A1 2/2017 Luo et al.

FOREIGN PATENT DOCUMENTS

| CN | 105281367 A | 1/2016 |
| CN | 108199414 B | 5/2020 |

*Primary Examiner* — Daniel Cavallari
(74) *Attorney, Agent, or Firm* — Maier & Maier, PLLC

(57) ABSTRACT

An energy storage system includes at least two power conversion systems PCSs, output terminals of the at least two PCSs are connected in parallel to connect to an alternating current power grid, and input terminals of the at least two PCSs are connected to an energy storage power supply. The first PCS is any one of the at least two PCSs. The voltage detection circuit detects a power grid voltage at a parallel connection point of the output terminals of the at least two PCSs. When determining, based on the power grid voltage at the parallel connection point, that islanding occurs in the alternating current power grid, the controller adjusts an angle of an output voltage of the first PCS to a reference angle, so that angles of output voltages of the at least two PCSs are the same.

13 Claims, 9 Drawing Sheets

1

ENERGY STORAGE SYSTEM, ON/OFF-GRID SWITCHING METHOD, AND POWER CONVERSION SYSTEM

CROSS-REFERENCE TO RELATED APPLICATION

This application claims priority to Chinese Patent Application No. 202110872541.3, filed on Jul. 30, 2021, which is hereby incorporated by reference in its entirety.

TECHNICAL FIELD

The embodiments relate to the field of power system technologies, an energy storage system, an on/off-grid switching method, and a power conversion system.

BACKGROUND

With aggravation of global environmental pollution, green energy resources, such as photovoltaic power, wind power, and hydro power, are becoming more and more popular. To better implement cooperation between an energy storage system and a power grid, the energy storage system may participate in various adjustment tasks (such as reactive power adjustment) of the power grid through grid connection.

Usually, the energy storage system includes a plurality of power conversion systems (PCS), and output terminals of the plurality of PCSs are connected in parallel to connect to the power grid. To enable the PCS to participate in the adjustment tasks of the power grid, the PCS operates in a current source mode. A characteristic of a current source is as follows: When on-grid, the PCS actively detects a frequency and a phase of a power grid voltage and controls its own output current based on the frequency and the phase of the power grid voltage. An internal impedance is characterized by a high value.

The energy storage system usually has a local load. When a fault occurs on the power grid, the PCS needs to be switched from an on-grid mode to an off-grid mode to supply power to the local load. This is referred to as on/off-grid switching of the PCS for short. In an on/off-grid switching process, considering reliability and stability of power supply to the load, the PCS needs to ensure as much as possible that a current provided to the load is not abruptly changed, so as to implement seamless on/off-grid switching.

In a case of on/off-grid switching caused by an exception of the power grid, there is no communication between the plurality of PCSs. Each PCS independently detects the power grid voltage and independently performs on/off-grid switching, and angles of output voltages of the plurality of PCSs tend to vary greatly. Consequently, a large cross current occurs between the PCSs, seamless on/off-grid switching cannot be implemented, and the power supply to the load is affected.

SUMMARY

To resolve the foregoing problems, the embodiments may provide an energy storage system, an on/off-grid switching method, and a power conversion system, so that when PCSs perform on/off-grid switching, angles of output voltages of the PCSs are the same, thereby suppressing a relatively large cross current between the PCSs during on/off-grid switching, and supplying stable power to a local load.

An embodiment may provide an energy storage system, including a plurality of PCSs. Output terminals of the plurality of PCSs are connected in parallel to connect to an alternating current power grid. Input terminals of the plurality of PCSs are connected to an energy storage power supply. For example, there are at least two PCSs, and without communicating with each other, the at least two PCSs independently collect a power grid voltage at a parallel connection point, and independently implement on/off-grid switching. On/Off-grid switching principles of the PCSs are the same. A first PCS of the at least two PCSs may include a voltage detection circuit, a power conversion circuit, and a controller. The first PCS is any one of the at least two PCSs. The power conversion circuit converts, in an on-grid state, electric energy provided by the energy storage power supply, and outputs converted electric energy to the alternating current power grid. The voltage detection circuit detects a power grid voltage at a parallel connection point of output terminals of the at least two PCSs. When determining, based on the power grid voltage at the parallel connection point, that islanding occurs in the alternating current power grid, the controller adjusts an angle of an output voltage of the first PCS to a reference angle. Because the reference angle is obtained by the first PCS based on an angular frequency of the power grid voltage when the at least two PCSs are on-grid, angles of output voltages of the at least two PCSs are the same. In this way, when performing on/off-grid switching, the plurality of PCSs switch angles of output voltages to a same reference angle, so that phases of the output voltages are the same. Therefore, no large cross current is caused by a phase difference, that is, asynchronization, between the PCSs, and stable power can be supplied to a local load. It should be understood that, during on/off-grid switching, an angle of an output voltage of each PCS is synchronized with an angle of an output current, that is, the angle of the output voltage becomes consistent with the angle of the output current.

To resolve a problem of a relatively large cross current between the plurality of PCSs during on/off-grid switching, in the energy storage system provided in this embodiment, when the plurality of PCSs work normally on grid, the output terminals of the plurality of PCSs are connected to the alternating current power grid, so that an angular frequency of a power grid voltage can be obtained in real time, and the reference angle can be obtained by using the angular frequency of the power grid voltage. When the alternating current power grid is abnormal, the plurality of PCSs may need to operate off grid, that is, switch from on-grid to off-grid. This is simply referred to as on/off-grid switching. Each PCS adjusts the angle of its own output voltage to the reference angle. When on-grid, all the PCSs are connected to the alternating current power grid and obtained reference angles each are obtained based on the power grid voltage. Therefore, the reference angles obtained by all the PCSs are the same. When each PCS adjusts the angle of the output voltage to the reference angle, it can be ensured that the angles of the output voltages of all the PCSs are the same, that is, are the reference angle. Therefore, there is no problem of different angles of output voltages between the plurality of PCSs, and there is no relatively large cross current between the plurality of PCSs. In this way, when off-grid, the plurality of PCSs can ensure stable power supply to the local load.

In a possible implementation, the controller may be configured to: when the alternating current power grid is normal, that is, when at least two PCSs are on-grid, perform phase locking on the power grid voltage to obtain the angular frequency of the power grid voltage; and then perform filtering (for example, low-pass filtering or sliding average filtering) on a phase-locked angular frequency, and perform integration on an angular frequency obtained after the filtering, to obtain the reference angle. When islanding occurs in the power grid, the power grid voltage may encounter a large angular frequency jump. To continue to supply stable power to the local load, the PCS needs to provide the local load with a phase existing before the jump of the power grid voltage. Therefore, filtering is intended to make the angular frequency change slowly. When an input angular frequency encounters a transient change, an output angular frequency may remain unchanged. In this way, when the PCS is off-grid, an abrupt change of the angular frequency is turned into a slow change, thereby eliminating impact of a transient state. In addition, filtering can also filter out an interfering signal.

The following describes two different manners of obtaining the reference angle. Filtering may be first performed on an angular frequency, and a sum of an angular frequency obtained after the filtering and a reference angular frequency is then obtained; or a sum of an angular frequency and a reference angular frequency may be first obtained, and filtering is then performed on the sum.

In a first manner, when each PCS is on-grid, the controller performs coordinate transformation on the power grid voltage to obtain a Q-axis component in a rotating coordinate system, performs phase locking on the Q-axis component to obtain an angular frequency, performs low-pass filtering on a sum of the angular frequency and the reference angular frequency, and performs integration on an angular frequency obtained after the low-pass filtering to obtain the reference angle.

In a second manner, in the on-grid state, the controller performs coordinate transformation on the power grid voltage to obtain a Q-axis component in a rotating coordinate system, performs phase locking on the Q-axis component to obtain an angular frequency, performs low-pass filtering on the angular frequency, and performs integration on a sum of the reference angular frequency and an angular frequency obtained after the low-pass filtering to obtain the reference angle.

In a possible implementation, the controller is further configured to: obtain a phase of the power grid voltage when the at least two PCSs are on-grid and correct the reference angle by using the phase of the power grid voltage; and when islanding occurs in the alternating current power grid, adjust the angle of the output voltage to a corrected reference angle.

In a possible implementation, when the at least two PCSs are on-grid, the controller obtains the phase-locked angular frequency of the power grid voltage and performs integration on a sum of the angular frequency and the reference angular frequency to obtain the phase of the power grid voltage.

In a possible implementation, when the controller performs filtering on the sum of the angular frequency and the reference angular frequency, the angular frequency may be attenuated after the filtering, and an error may increase with time. The reference angle obtained after the integration may also have an error. Therefore, the reference angle may be corrected at a scheduled time to compensate for the error of the reference angle. That is, the controller zeroes out the reference angle at a zero crossing point of the phase of the power grid voltage and obtains the corrected reference angle by re-performing filtering and then integration on the phase-locked angular frequency of the power grid voltage.

In a possible implementation, the controller is further configured to: when the at least two PCSs are on-grid, use the phase of the power grid voltage as the angle of the output voltage of the first PCS.

In a possible implementation, a waveform of the reference angle is a sawtooth wave, and an angle of the sawtooth wave varies from 0 degrees to 360 degrees with a sine wave.

In a possible implementation, the controller detects a frequency or an amplitude of the power grid voltage at the parallel connection point, and when the frequency of the power grid voltage at the parallel connection point exceeds a preset frequency range or the amplitude of the power grid voltage at the parallel connection point exceeds a preset amplitude range, determines that islanding occurs in the alternating current power grid; and the controller is further configured to: when determining that islanding occurs in the alternating current power grid, set an islanding flag bit to 1, and set an angular frequency adjustment amount to 0, and is further configured to: when determining that a grid connection circuit breaker is disconnected, set the islanding flag bit to 2, and set the angular frequency adjustment amount based on a power angle characteristic, so that each PCS implements equal power division, where the grid connection circuit breaker is connected between the parallel connection point and the alternating current power grid.

Based on the energy storage system described in the foregoing embodiment, an embodiment may further provide an on/off-grid switching method for an energy storage system. The energy storage system includes at least two power conversion systems PCSs, output terminals of the at least two PCSs are connected in parallel to connect to an alternating current power grid, and input terminals of the at least two PCSs are connected to an energy storage power supply; and the method is applicable to a first PCS in the at least two PCSs, the first PCS is any one of the at least two PCSs, and the method includes the following steps: detecting a power grid voltage at a parallel connection point of the output terminals of the at least two PCSs; and when determining, based on the power grid voltage at the parallel connection point, that islanding occurs in the alternating current power grid, adjusting an angle of an output voltage of the first PCS to a reference angle, so that angles of output voltages of the at least two PCSs are the same, where the reference angle is obtained by the first PCS based on an angular frequency of the power grid voltage when the at least two PCSs are on-grid.

In a possible implementation, the method further includes: obtaining, when the at least two PCSs are on-grid, the reference angle by performing filtering and then integration on a phase-locked angular frequency of the power grid voltage.

In a possible implementation, the obtaining, when the at least two PCSs are on-grid, the reference angle by performing filtering and then integration on a phase-locked angular frequency of the power grid voltage may include:

when on-grid, performing coordinate transformation on the power grid voltage to obtain a Q-axis component in a rotating coordinate system, performing phase locking on the Q-axis component to obtain an angular frequency, performing low-pass filtering on a sum of the angular frequency and a reference angular frequency, and performing integration on an angular frequency obtained after the low-pass filtering to obtain the reference angle.

In a possible implementation, the obtaining, when the at least two PCSs are on-grid, the reference angle by performing filtering and then integration on a phase-locked angular frequency of the power grid voltage may include:

when on-grid, performing coordinate transformation on the power grid voltage to obtain a Q-axis component in a rotating coordinate system, performing phase locking on the Q-axis component to obtain an angular frequency, performing low-pass filtering on the angular frequency, and performing integration on a sum of a reference angular frequency and an angular frequency obtained after the low-pass filtering to obtain the reference angle.

In a possible implementation, the method further includes: obtaining a phase of the power grid voltage when the at least two PCSs are on-grid and correcting the reference angle by using the phase of the power grid voltage; and when islanding occurs in the alternating current power grid, adjusting the angle of the output voltage to a corrected reference angle.

In a possible implementation, the obtaining a phase of the power grid voltage when the at least two PCSs are on-grid may include: when the at least two PCSs are on-grid, obtaining the phase-locked angular frequency of the power grid voltage, and performing integration on a sum of the angular frequency and the reference angular frequency to obtain the phase of the power grid voltage.

In a possible implementation, the correcting the reference angle by using the phase of the power grid voltage may include: zeroing out the reference angle at a zero crossing point of the phase of the power grid voltage and obtaining the corrected reference angle by re-performing filtering and then integration on the phase-locked angular frequency of the power grid voltage.

An embodiment may further provide a power conversion system. The power conversion system (PCS) is a first PCS in at least two PCSs, the first PCS is any one of the at least two PCSs, and output terminals of the at least two PCSs are connected in parallel to connect to an alternating current power grid. The first PCS includes a voltage detection circuit, a power conversion circuit, and a controller. The power conversion circuit is configured to: convert, in an on-grid state, electric energy provided by an energy storage power supply, and output converted electric energy to the alternating current power grid. The voltage detection circuit is configured to detect a power grid voltage at a parallel connection point of the output terminals of the at least two PCSs. The controller is configured to: when determining, based on the power grid voltage at the parallel connection point, that islanding occurs in the alternating current power grid, adjust an angle of an output voltage of the PCS to a reference angle, so that angles of output voltages of the at least two PCSs are the same, where the reference angle is obtained by the first PCS based on an angular frequency of the power grid voltage when the at least two PCSs are on-grid.

The power conversion system provided in this embodiment may collect the voltage at the parallel connection point in real time. In the on-grid state, the collected voltage signal passes through a phase-locked loop, to obtain an angular frequency adjustment amount. An output angle is obtained by performing integration on an angular frequency obtained based on a sum of the angular frequency adjustment amount and a reference angular frequency, and the output angle is input to a PCS control loop for on-grid control. In addition, filtering and integration are performed on the angular frequency, and then correction is performed to obtain a corrected reference angle. Because the plurality of PCSs may have a same parallel connection point, a reference angle of each PCS may be the same. When it is determined that islanding occurs, the angular frequency adjustment amount is switched to 0, and in addition, the angle of the output voltage of each PCS is made consistent with the reference angle. After they are consistent, it is ensured that the angle of the output voltage of each PCS is the same, and then the angle is input to the PCS control loop for off-grid control.

In a possible implementation, the controller may be configured to: perform, in the on-grid state, coordinate transformation on the power grid voltage to obtain a Q-axis component in a rotating coordinate system, perform phase locking on the Q-axis component to obtain an angular frequency, perform low-pass filtering on a sum of the angular frequency and a reference angular frequency, and perform integration on an angular frequency obtained after the low-pass filtering to obtain the reference angle.

In a possible implementation, the controller may be configured to: when the at least two PCSs are on-grid, obtain the phase-locked angular frequency of the power grid voltage, perform integration on a sum of the angular frequency and the reference angular frequency to obtain a phase of the power grid voltage, and correct the reference angle by using the phase of the power grid voltage; and when islanding occurs in the alternating current power grid, adjust the angle of the output voltage to a corrected reference angle.

In a possible implementation, the controller zeroes out the reference angle at a zero crossing point of the phase of the power grid voltage and obtains the corrected reference angle by re-performing filtering and then integration on the phase-locked angular frequency of the power grid voltage.

When it is detected that islanding occurs in the alternating current power grid, in an on/off-grid switching process, the angular frequency adjustment amount is 0, and correction is performed on the reference angle by using a zero crossing point of a phase obtained after integration is performed on the reference angular frequency, so that the reference angle is zeroed out and corrected at the zero crossing point of the phase. In other words, in the on/off-grid switching process, the angular frequency does not need to be adjusted, and the angular frequency adjustment amount output by the phase-locked loop PLL has no effect anymore. In this case, the angular frequency no longer changes. The reference angle is corrected only by using the phase obtained after integration is performed on the reference angular frequency (for example, 50 Hz), to ensure that the angle of the output voltage of each PCS is made consistent with a same reference angle although each PCS determines islanding at a different moment, thereby ensuring that the angles of the output voltages of the plurality of PCSs are synchronous.

The embodiments may have at least the following advantages:

The output terminals of the plurality of PCSs in the energy storage system provided in the embodiments may be connected in parallel to connect to the alternating current power grid. When the power grid voltage is normal, each PCS operates normally on grid. When on-grid, each PCS performs phase locking on the power grid voltage to obtain the angular frequency and obtains the reference angle based on the angular frequency and reserves the reference angle for use. When islanding occurs in the alternating current power grid, each PCS adjusts the angle of the output voltage to the respective obtained reference angle. Because the reference angle obtained by each PCS is obtained by performing phase locking on the power grid voltage when the alternating current power grid is normal, the reference angle obtained by each PCS is the same. When islanding occurs, each PCS switches the angle of the output voltage to the respective obtained reference angle, that is, the angles of the output voltages of all the PCSs are made consistent with the reference angle. This ensures that the angle of the output voltage of each PCS is the same, thereby suppressing a relatively large cross current between the PCSs and ensuring that each PCS can supply stable power to the local load during on/off-grid switching.

DETAILED DESCRIPTION OF THE EMBODIMENTS

The following describes the embodiments with reference to the accompanying drawings.

The terms such as "first" and "second" are used only for the purpose of description and cannot be understood as indicating or implying relative importance or implicitly indicating a quantity of features indicated. Therefore, a feature limited by "first" or "second" may explicitly or implicitly include one or more features. In the embodiments, unless otherwise specified, a "plurality of" means two or more than two.

Unless otherwise expressly specified and limited, the term "connection" should be understood in a broad sense. For example, "connection" may be a fixed connection, a detachable connection, or an integrated connection, or may be a direct connection or an indirect connection through an intermediate medium. In addition, the term "coupling" may be a manner of implementing electrical connection of signal transmission. "Coupling" may be a direct electrical connection or may be an indirect electrical connection through an intermediate medium.

Energy Storage System Embodiment

To enable a person skilled in the art to better understand the embodiments, the following first describes an application scenario of the solutions. This embodiment may relate to an energy storage system. The energy storage system may operate on grid and may supply power to a load together with an alternating current power grid. When a fault occurs in the alternating current power grid, the energy storage system may supply power to the load independently. An application scenario of the energy storage system may be a large-scale energy storage application scenario, a small/medium-scale distributed energy storage application scenario, or a home energy storage application scenario.

Figure 1:
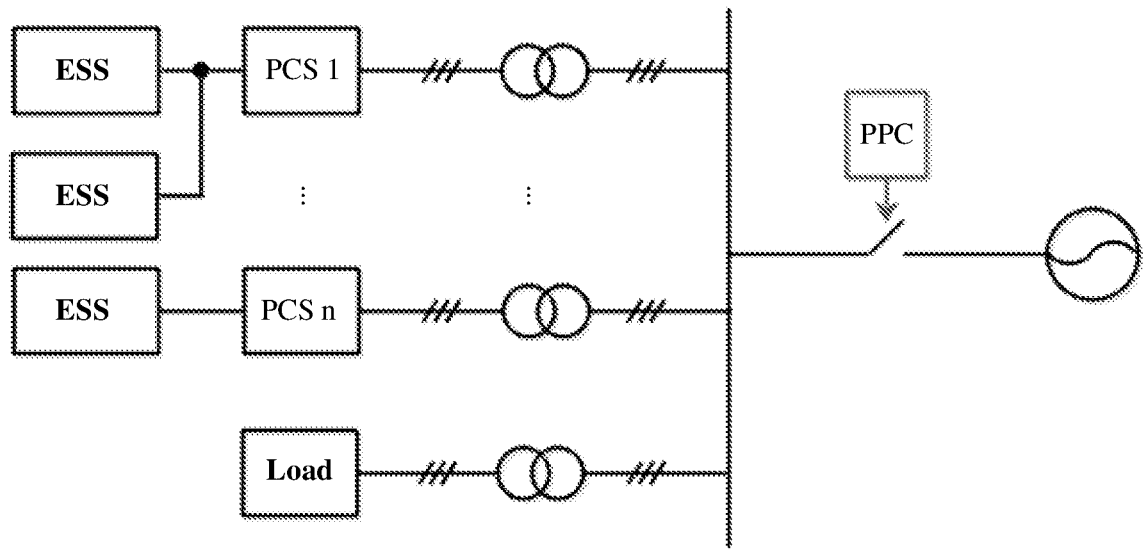
FIG. 1 is a schematic diagram of an energy storage system according to an embodiment.

FIG. 1 is a schematic diagram of an energy storage system according to an embodiment.

The energy storage system usually includes a plurality of PCSs. As shown in FIG. 1, n PCSs are included, where n is a positive integer greater than or equal to 2. The n PCSs are respectively a PCS 1 to a PCS n. An input terminal of each PCS is connected to the energy storage system (ESS). Each PCS may be connected to one ESS or may be connected to a plurality of ESSs. For example, the PCS 1 is connected to one ESS, and the PCS n is connected to one ESS. This is not limited in this embodiment, and may be set based on an actual requirement. For example, for an optical storage system, the ESS may be an energy storage container, and electric energy in a battery cluster in the energy storage container may be obtained through photovoltaic power. For example, the ESS may include a photovoltaic module, a battery system, a direct current-direct current converter, and the like. The plurality of PCSs may be separately connected to a first side of a transformer, or the plurality of PCSs may be connected to the first side of the transformer through alternating current coupling. A second side of the transformer is connected to an on-grid switch. The on-grid switch may be implemented by using a grid connection circuit breaker.

Figure 2:
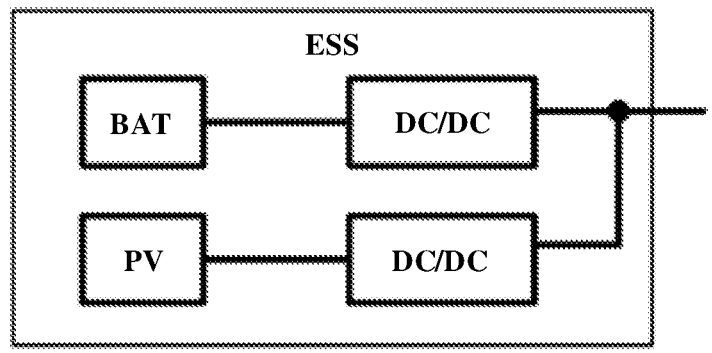
FIG. 2 is a schematic diagram of direct current coupling of optical storage according to an embodiment.

In addition, the optical storage system includes coupling between photovoltage and energy storage. FIG. 2 is a schematic diagram of optical storage-to-direct current coupling according to an embodiment. A direct current power supply of the ESS may alternatively come from wind power, hydro power, a battery, or the like.

The ESS in FIG. 1 may include a battery BAT, a photovoltaic module PV, and direct current/direct current (DC/DC) circuits in FIG. 2, that is, the BAT is connected to a corresponding DC/DC circuit, the PV is connected to a corresponding DC/DC circuit, and all output terminals are connected in parallel.

A PPC in FIG. 1 is a power plant controller or a host computer. The PPC is configured to control an open or closed status of the grid connection circuit breaker, for example, control the grid connection circuit breaker to be disconnected or connected. When the alternating current power grid is normal, the PPC controls the grid connection circuit breaker to be connected, and the PCS is connected to the alternating current power grid for on-grid operation. Load is a local load. When the alternating current power grid is abnormal, for example, when islanding occurs, the PPC controls the grid connection circuit breaker to be disconnected. The PCS is disconnected from the alternating current power grid, operates off grid, and supplies power to the local load Load.

When the PCS operates on grid, the PCS operates in a current source mode. When the alternating current power grid fails and trips, the energy storage system needs to switch to operate off grid, to supply power to the local load. Therefore, the PCS needs to operate in a voltage source mode, to provide a stable voltage for the local load.

Because there is no communication between the plurality of PCSs, each PCS independently performs sampling, independently determines, based on a power grid voltage, whether islanding occurs, and performs off-grid control when islanding occurs. Because a cable length between a voltage detection circuit of each PCS and a parallel connection point varies, a line impedance varies with the cable length, and a generated voltage drop varies with the line impedance. Further, a power grid voltage detected by each PCS is different. As a result, an islanding moment of the power grid that is determined by each PCS is different. Further, a moment at which each PCS switches from on-grid to off-grid is different, and an output angle varies greatly. This causes a large cross current and affects stability of power supply to the local load.

To resolve a problem of a relatively large cross current between the plurality of PCSs during on/off-grid switching, in the energy storage system provided in this embodiment, when the plurality of PCSs work normally on grid, the output terminals of the plurality of PCSs are connected to the alternating current power grid, so that an angular frequency of the power grid voltage can be obtained in real time, and a reference angle can be obtained by using the angular frequency of the power grid voltage. When the alternating current power grid is abnormal, the plurality of PCSs may need to operate off grid, that is, switch from on-grid to off-grid. This is simply referred to as on/off-grid switching. Each PCS adjusts an angle of its own output voltage to the reference angle. When on-grid, all the PCSs are connected to the alternating current power grid and obtained reference angles each are obtained based on the power grid voltage. Therefore, the reference angles obtained by all the PCSs are the same. When each PCS adjusts the angle of the output voltage to the reference angle, it can be ensured that the angles of the output voltages of all the PCSs are the same, that is, are the reference angle. Therefore, there is no problem of different angles of output voltages between the plurality of PCSs, and there is no relatively large cross current between the plurality of PCSs. In this way, when off-grid, the plurality of PCSs can ensure stable power supply to the local load.

To enable a person skilled in the art to better understand the embodiments, the following describes in detail the embodiments with reference to the accompanying drawings.

Figure 3:
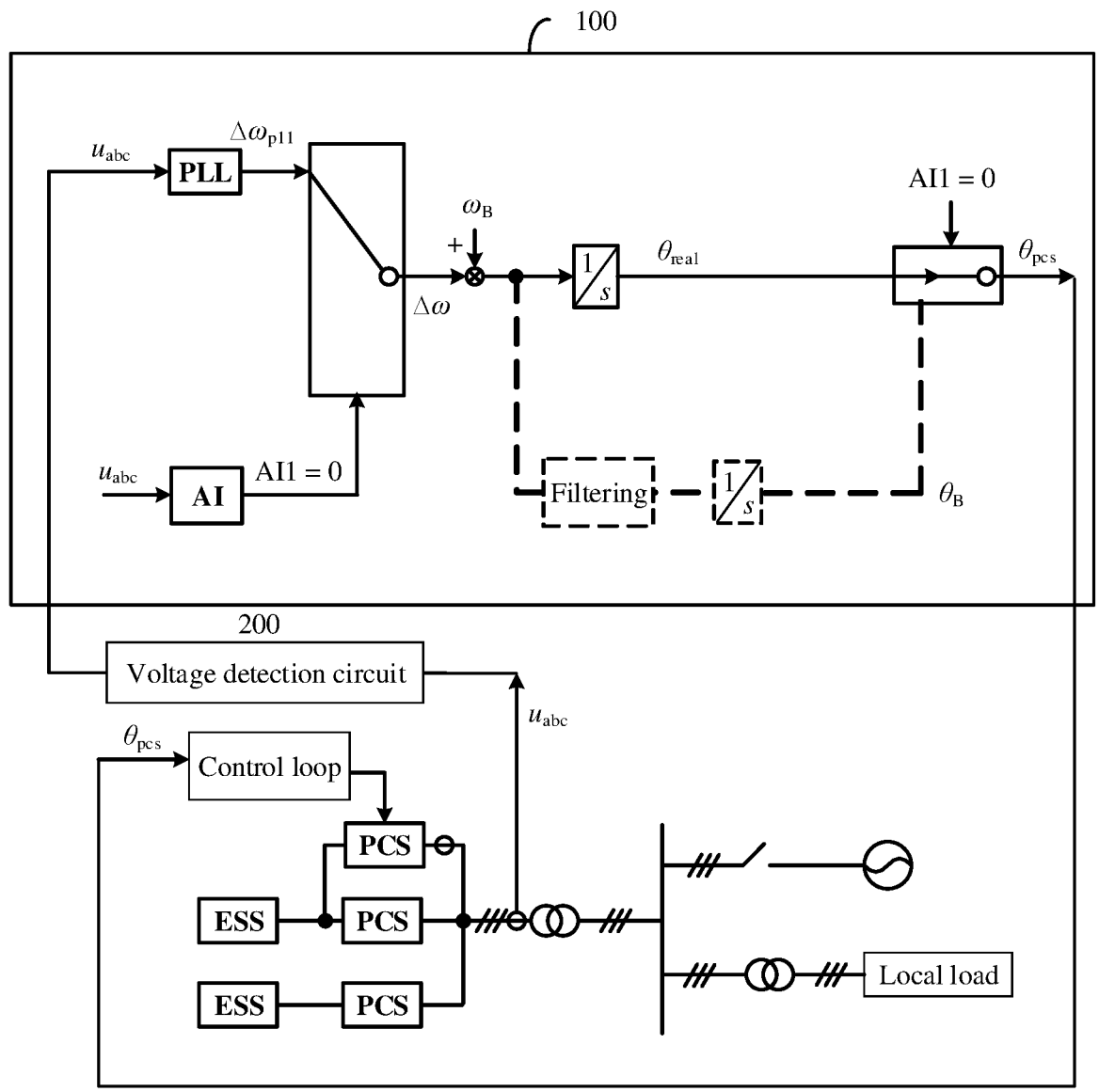
FIG. 3 is a diagram of a control architecture of an energy storage system according to an embodiment.

FIG. 3 is a diagram of a control architecture of an energy storage system according to an embodiment.

The energy storage system provided in this embodiment may include at least two power conversion systems PCSs, and output terminals of the at least two PCSs are connected in parallel to connect to an alternating current power grid. FIG. 3 only shows three PCSs schematically. A quantity of PCSs is not limited in this embodiment. Input terminals of the three PCSs are connected to an energy storage power supply. The energy storage power supply may come from photovoltaic power, wind power, hydro power, or a battery. That is, the ESS outputs a direct current, and the PCS may convert the direct current into an alternating current same as that in the power grid. An input terminal of each PCS may be connected to an independent ESS, or a plurality of PCSs may be connected to one same ESS.

In the energy storage system provided in this embodiment, the plurality of PCSs may independently complete on/off-grid switching without being controlled by another device. Synchronization is not required between the plurality of PCSs, that is, the plurality of PCSs do not need to send an off-grid synchronization signal to each other.

In this embodiment, each PCS may independently complete its own on/off-grid switching. Therefore, for each PCS, an on/off-grid switching principle is the same. For ease of description, any one of the plurality of PCSs is used as an example below for description, and another PCS has the same on/off-grid control principle. Details are not described herein. For ease of description, a first PCS is used to represent any one of the plurality of PCSs.

The first PCS includes a voltage detection circuit 200, a power conversion circuit (that is, a PCS in the figure), and a controller 100. The power conversion circuit is configured to: convert, in an on-grid state, electric energy provided by the energy storage power supply, and output converted electric energy to the alternating current power grid.

The voltage detection circuit 200 is configured to detect a power grid voltage at a parallel connection point of the output terminals of the at least two PCSs.

The parallel connection point is a point at which the output terminals of the plurality of PCSs are connected in parallel. In the figure, the output terminals of the PCSs are connected to a first side of a transformer, and a second side of the transformer is connected to the alternating current power grid. In this case, the parallel connection point is a point at which the PCSs are connected to the first side of the transformer.

The controller 100 is configured to: when determining, based on the power grid voltage of the parallel connection point, that islanding occurs in the alternating current power grid, adjust an angle of an output voltage of the first PCS to a reference angle, so that angles of output voltages of the at least two PCSs are the same. The reference angle is obtained based on an angular frequency of the power grid voltage when the at least two PCSs are on-grid. It should be understood that, because the reference angle is obtained when the plurality of PCSs may be normally on-grid, reference angles obtained by the at least two PCSs are the same.

If islanding occurs in the alternating current power grid, it indicates that the power grid is abnormal and cannot continue to normally supply power to a local load. In this case, the PCS is required to supply power to the local load. When the PCS operates on grid, the PCS is equivalent to a current source, and the alternating current power grid provides a stable voltage for the local load. When the PCS operates off grid, the PCS needs to be equivalent to a voltage source to provide electric energy for the local load, so that the PCS provides a stable voltage for the local load.

A control loop in the figure may also be implemented by the controller 100.

To facilitate understanding of a working principle of the controller 100, FIG. 3 shows a control link inside the controller 100.

To facilitate understanding of the embodiments, the following first describes a control principle of a PCS when no islanding (transition) occurs in the alternating current power grid.

A solid line in the controller 100 represents a working process in a normal on-grid case, and a dashed line represents a working process of the controller 100 in a case that islanding occurs in the alternating current power grid.

First, a control process of on-grid working corresponding to the solid line in FIG. 3 is described.

When the PCS works normally on grid, the voltage detection circuit 200 detects a three-phase voltage $u_{abc}$ at the output terminal of the PCS. Coordinate transformation is performed to transform a static coordinate system into a Q-axis component of the voltage in a two-phase rotating coordinate system. Then, the Q-axis component passes through a phase-locked loop PLL to obtain an angular frequency adjustment amount $\Delta\omega_{pll}$ representing a rotational speed of the power grid voltage. The voltage in the rotating coordinate system is a vector, and the angular frequency is a frequency of rotation. In the on-grid state, the angular frequency adjustment amount $\Delta\omega=\Delta\omega_{pll}$, that is, an angular frequency $\Delta\omega_{pll}$ output by the PLL and a reference angular frequency $\omega_B$ (a fixed angular frequency of the power grid is 50 Hz or 60 Hz) are added. Integration is performed on a sum of the angular frequency $\Delta\omega_{pll}$ and the reference angular frequency $\omega_B$ to obtain a phase $\theta_{real}$ of the power grid voltage. In the figure, 1/s represents integration. In this case, the power grid is normal and no islanding occurs. Therefore, there is no islanding flag. In the figure, AI only indicates islanding detection. AI1 is an output signal of AI and is an islanding flag bit representing the islanding flag. When AI1 is equal to 0, it indicates that the alternating current power grid is normal and no islanding occurs. This flag determines final $\theta_{pcs}$ for the control loop. Islanding detection may be determined by using the power grid voltage or may be determined by using a power grid current. For example, if an amplitude or a frequency of the power grid voltage has an offset, and is excessively large or excessively small, it may be determined that islanding occurs in the power grid. If the power grid voltage is normal, it is determined that no islanding occurs, and the PCS operates normally on grid. In this case, $\theta_{pcs}$ is equal to $\theta_{real}$, that is, $\theta_{real}$ real is directly output to the control loop. The control loop herein refers to a control loop, for a power grid angle, that is required for the PCS to be on-grid, for example, a current loop, a voltage loop, or a power loop. The control loop controls the PCS to perform power control or voltage control. The foregoing control loops each are a control loop in a case that the PCS is normally on-grid. Details are not described herein. The PCS may work normally and perform voltage loop control, so as to detect its own output voltage.

In addition, when the PCS operates normally on grid, the controller of each PCS obtains an angular frequency in real time by performing phase locking on the power grid voltage. The reference angle is obtained based on the angular frequency. The reference angle has no effect when no islanding occurs in the power grid and plays a role only in an on/off-grid switching process.

At a moment when islanding occurs in the alternating current power grid, a PLL of each PCS may output a different angular frequency adjustment amount. Consequently, an angle of an output voltage of each PCS is different, and there is a phase difference between the PCSs. This causes a relatively large cross current in an off-grid state.

The following describes a process, of switching from on-grid to off-grid, corresponding to the dashed line in FIG. 3.

When determining, based on the power grid voltage at the parallel connection point of the plurality of PCSs, that islanding occurs in the alternating current power grid, the controller adjusts the angle of the output voltage of the PCS to the reference angle. $\theta_B$ is assigned to $\theta_{real}$, that is, $\theta_{pcs}$ used by the control loop at this time is equal to $\theta_B$. The reference angle $\theta_B$ is obtained by the at least two PCSs in the on-grid state based on the angular frequency of the power grid voltage. Reference angles obtained by the at least two PCSs are the same.

Each PCS independently implements on/off-grid switching. When on-grid, each PCS obtains an angular frequency of the power grid voltage in real time and obtains a reference angle based on the angular frequency of the power grid voltage. Therefore, the reference angle obtained by each PCS is the same. When the PCS performs on/off-grid switching, each PCS switches to the respective obtained reference angle. Because the reference angle obtained by each PCS is the same, a large difference in the angles of the output voltages of the PCSs can be avoided, and a cross current between the PCSs can be further suppressed. It should be understood that, during on/off-grid switching, the angle of the output voltage of the PCS is the same as an angle of an output current, that is, the output voltage is synchronous with the output current.

In an implementation, the controller obtains the reference angle based on the angular frequency of the power grid voltage by filtering, for example, low-pass filtering or sliding average filtering. When islanding occurs in the power grid, the power grid voltage may encounter a large angular frequency jump. To continue to supply stable power to the local load, the PCS needs to provide the local load with a phase existing before the jump of the power grid voltage. Therefore, filtering is intended to make the angular frequency change slowly. When an input angular frequency encounters a transient change, an output angular frequency may remain unchanged. In this way, when the PCS is off-grid, an abrupt change of the angular frequency is turned into a slow change, thereby eliminating impact of a transient state. In addition, filtering can also filter out an interfering signal.

In the energy storage system provided in this embodiment, the output terminals of the plurality of PCSs may be connected in parallel to connect to the alternating current power grid. When the power grid voltage is normal, each PCS operates normally on grid, and each PCS obtains the reference angle based on the angular frequency of the power grid voltage. When islanding occurs in the alternating current power grid, each PCS adjusts the angle of its own output voltage to the respective obtained reference angle. Because the reference angle obtained by each PCS is obtained by performing phase locking on the power grid voltage when the alternating current power grid is normal, the reference angle obtained by each PCS is the same. When islanding occurs, each PCS switches the angle of the output voltage to the reference angle, that is, the angle of the output voltage is made consistent with the reference angle. This ensures that the angle of the output voltage of each PCS is the same, thereby suppressing a relatively large cross current between the PCSs and ensuring that each PCS can supply stable power to the local load.

In addition, in the energy storage system provided in this embodiment, all the PCSs may implement synchronization between the angles of the output voltages during on/off-grid switching, without relying on communication. Because the angles of the output voltages of all the PCSs are made consistent with the same reference angle, seamless switching is truly implemented in the on/off-grid switching process, and voltage distortion is small. Considering of a voltage tolerance capability of the local load during on/off-grid switching, in a switching transient process, for example, an amplitude of voltage distortion does not exceed 90% to 110% of a rated voltage as far as possible, and a phase jump is less than 5 degrees.

Figure 4A:
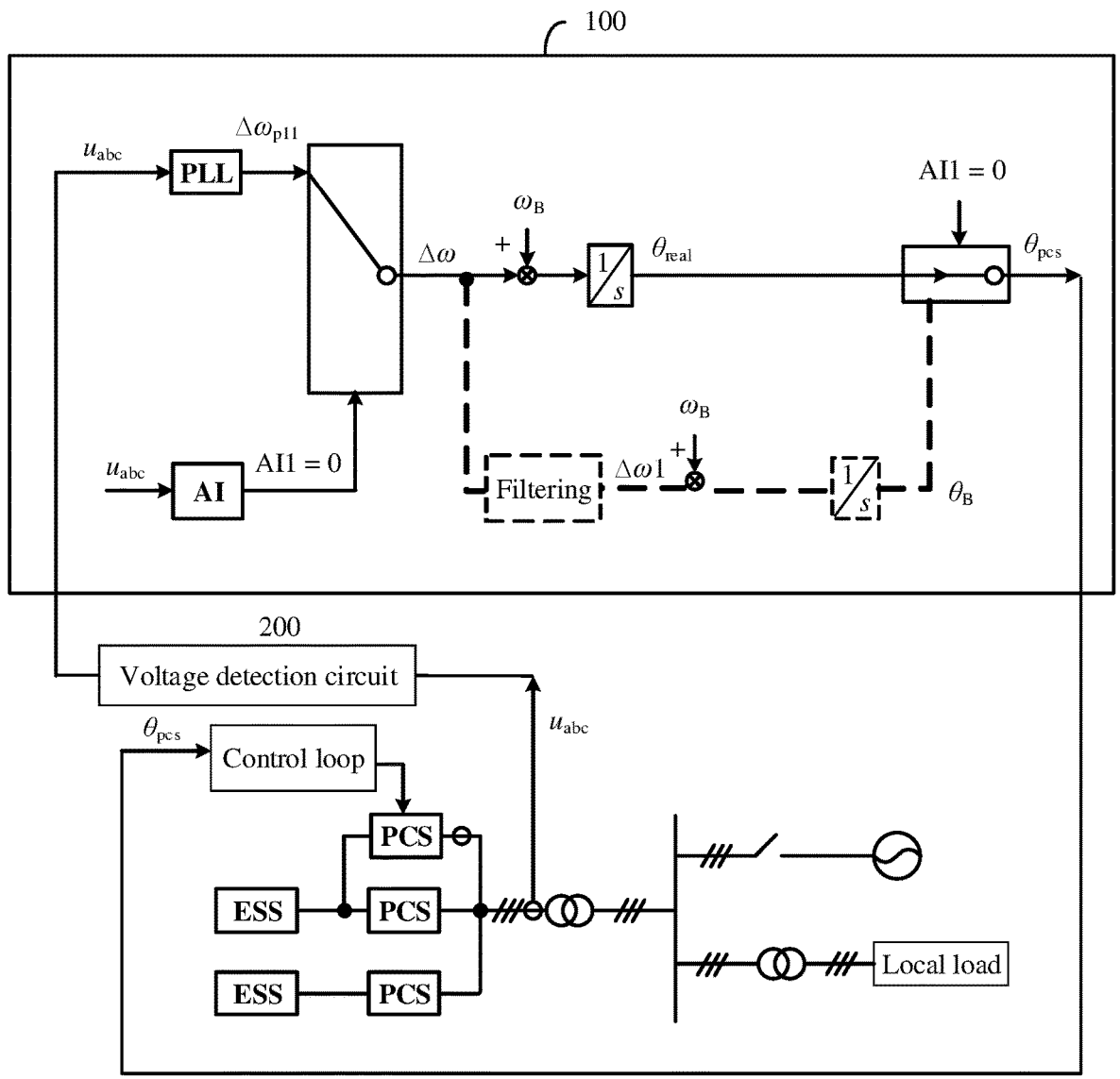
FIG. 4A is a diagram of another control architecture of an energy storage system according to an embodiment.

For the reference angle described in the foregoing embodiment, a sum of the angular frequency adjustment amount and the reference angular frequency is first obtained, filtering is performed on the sum of the angular frequency adjustment amount and the reference angular frequency, and then integration is performed on an angular frequency obtained after the filtering, to obtain the reference angle. In addition, there is another possible implementation. FIG. 4A is a diagram of another control architecture of an energy storage system according to an embodiment.

The controller may first perform filtering on the angular frequency adjustment amount $\Delta\omega$, calculate a sum of the reference angular frequency and an angular frequency adjustment amount $\Delta\omega 1$ obtained after the filtering, and then perform integration on the sum of the reference angular frequency $\omega_B$ and the angular frequency adjustment amount $\Delta\omega 1$ obtained after the filtering, to obtain the reference angle $\theta_B$.

A manner of obtaining the reference angle shown in FIG. 4A may be applicable to the embodiments. For ease of description, the following embodiments are described by using the manner of obtaining the reference angle shown in FIG. 3.

The following describes in detail a switching process in a case that islanding occurs in the alternating current power grid.

Figure 4B:
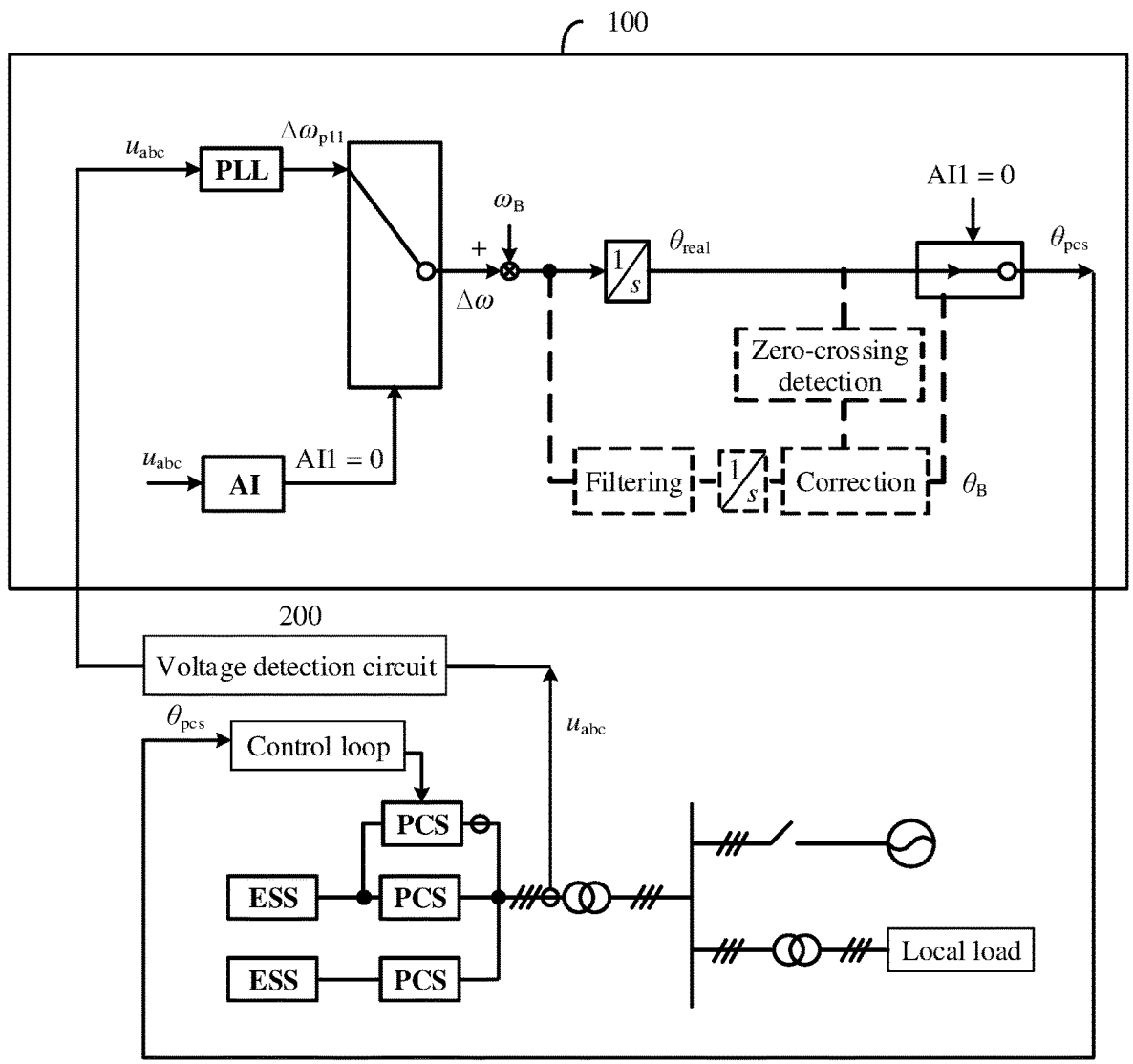
FIG. 4B is a diagram of still another control architecture of an energy storage system according to an embodiment.

FIG. 4B is a diagram of still another control architecture of an energy storage system according to an embodiment.

When the controller performs filtering on the sum of the angular frequency $\Delta\omega_{pll}$ and the reference angular frequency $\omega_B$, the angular frequency may be attenuated after the filtering, and an error may increase with time. The reference angle obtained after the integration may also have an error. Therefore, the reference angle may be corrected at a scheduled time to compensate for the error of the reference angle. The following describes a correction manner.

The controller is further configured to: obtain a phase of the power grid voltage when the at least two PCSs are on-grid and correct the reference angle by using the phase of the power grid voltage; and when islanding occurs in the alternating current power grid, adjust the angle of the output voltage to a corrected reference angle.

A manner of obtaining the phase of the power grid voltage during normal on-grid operation is as follows: When the at least two PCSs are on-grid, the controller obtains a phase-locked angular frequency of the power grid voltage and performs integration on a sum of the angular frequency and the reference angular frequency to obtain the phase of the power grid voltage, that is, $\theta_{real}$.

A manner in which the controller corrects the reference angle $\theta_B$ by using $\theta_{real}$ may be as follows: The controller zeroes out the reference angle $\theta_B$ at a zero crossing point of the phase $\theta_{real}$ of the power grid voltage, and obtains the corrected reference angle $\theta_B$ by re-performing filtering and then integration on the phase-locked angular frequency of the power grid voltage. The reference angle is zeroed out at each zero crossing point of $\theta_{real}$. Therefore, the reference angle is a periodic sawtooth wave. An angle of the sawtooth wave varies from 0 degrees to 360 degrees with a sine wave.

Figure 5:
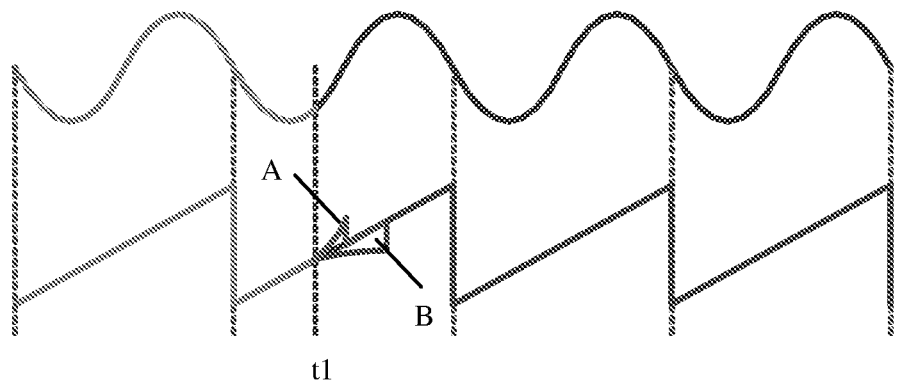
FIG. 5 is a diagram of waveforms of a power grid voltage and a reference angle according to an embodiment.

FIG. 5 is a diagram of waveforms of a power grid voltage and a reference angle according to an embodiment;

A sine wave in FIG. 5 may be the waveform of the power grid voltage, and a sawtooth wave in FIG. 5 may be the waveform of the reference angle provided in this embodiment.

For example, islanding occurs in the alternating current power grid starting from a moment t1. That output terminals of two PCSs are connected in parallel is used as an example. An angle of an output voltage of a PCS 1 is A, and an angle of an output voltage of a PCS 2 is B. It can be seen from the figure that, both A and B deviate from the sawtooth wave corresponding to the reference angle. When the PCS 1 and the PCS 2 determine that islanding occurs, the angle of the output voltage of the PCS 1 is adjusted to the reference angle, and the angle of the output voltage of the PCS 2 is adjusted to the reference angle, so that the angles of the output voltages of the PCS 1 and the PCS 2 are both the reference angle, and the angles of the output voltages of the PCS 1 and the PCS 2 are the same, thereby avoiding a relatively large cross current between the PCS 1 and the PCS 2 in parallel from occurring and from affecting stable power supply to the local load.

Correction of the reference angle by the controller is also performed when the PCS is normally on-grid, that is, the corrected reference angle is always obtained when the PCS is normally on-grid. The angle of the output voltage is switched to the corrected reference angle only upon on/off-grid switching.

The corrected reference angle obtained by each PCS may be used only once during on/off-grid switching, that is, $\theta_B$ may be assigned to $\theta_{pcs}$. After the switching is completed subsequently, each PCS implements operation in the off-grid state.

Figure 6:
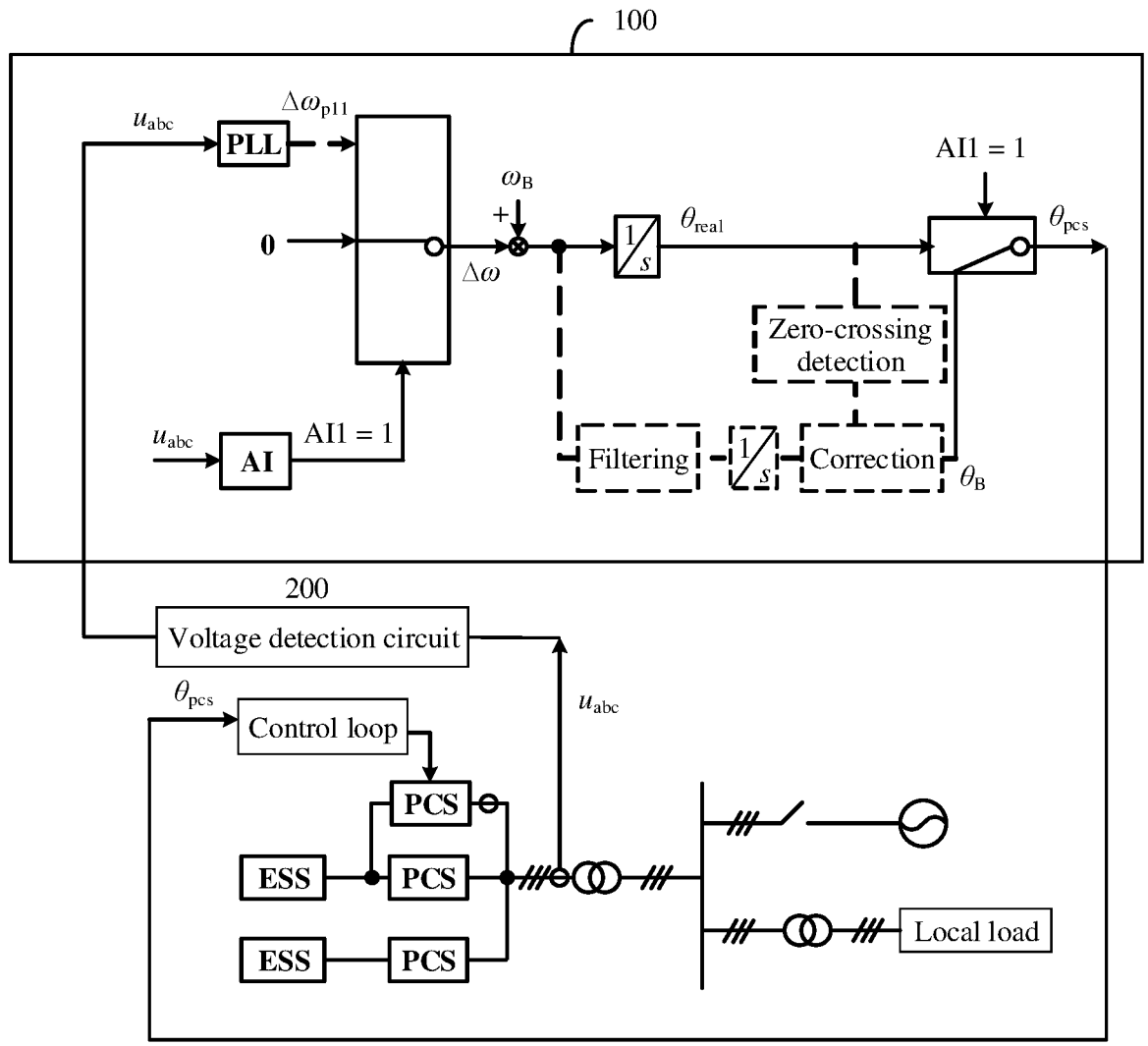
FIG. 6 is a schematic diagram of control during on/off-grid switching according to an embodiment.

FIG. 6 is a schematic diagram of control during on/off-grid switching according to an embodiment.

FIG. 6 and FIG. 4B are compared. In FIG. 4B, an islanding flag bit AI1 is 0, that is, no islanding has occurred, and the PCS operates in the on-grid state. In FIG. 6, an islanding flag bit AI1 is 1, that is, islanding has occurred in FIG. 6, and the PCS operates in a transition state of on/off-grid switching.

When AI determines that islanding occurs in the alternating current power grid, the islanding flag bit is set to 1, and the angular frequency adjustment amount becomes 0 at this time. That is, in the on/off-grid switching process, the angular frequency does not need to be adjusted, $\Delta\omega=0$, and the angular frequency adjustment amount $\Delta\omega_{pll}$ output by the phase-locked loop PLL has no effect anymore. In this case, the angular frequency no longer changes. The reference angle $\theta_B$ is corrected only by using the phase obtained after integration is performed on the reference angular frequency $\omega_B$ (for example, 50 Hz), that is, $\theta_{pcs}=\theta_B$, to ensure that the angle of the output voltage of each PCS is made consistent with a same reference angle although each PCS determines islanding at a different moment, thereby ensuring that the angles of the output voltages of the plurality of PCSs are synchronous.

To complete the entire on/off-grid switching, a switching process may need to be maintained for a period of time, for example, dozens to hundreds of milliseconds, to wait for disconnection of all switches connected to the alternating current power grid, that is, disconnection from the alternating current power grid. After switch operations are reliably completed, the entire on/off-grid switching is completed.

For the energy storage system provided in this embodiment, the following is described: a process in which when islanding occurs in the alternating current power grid, each PCS controls the angle of its own output voltage to be switched to the same reference angle and performs off-grid control after the switching is completed. The off-grid control is not described herein, that is, after the PCS is off grid, control of the angular frequency adjustment amount may belong to control over off-grid work.

Figure 7A:
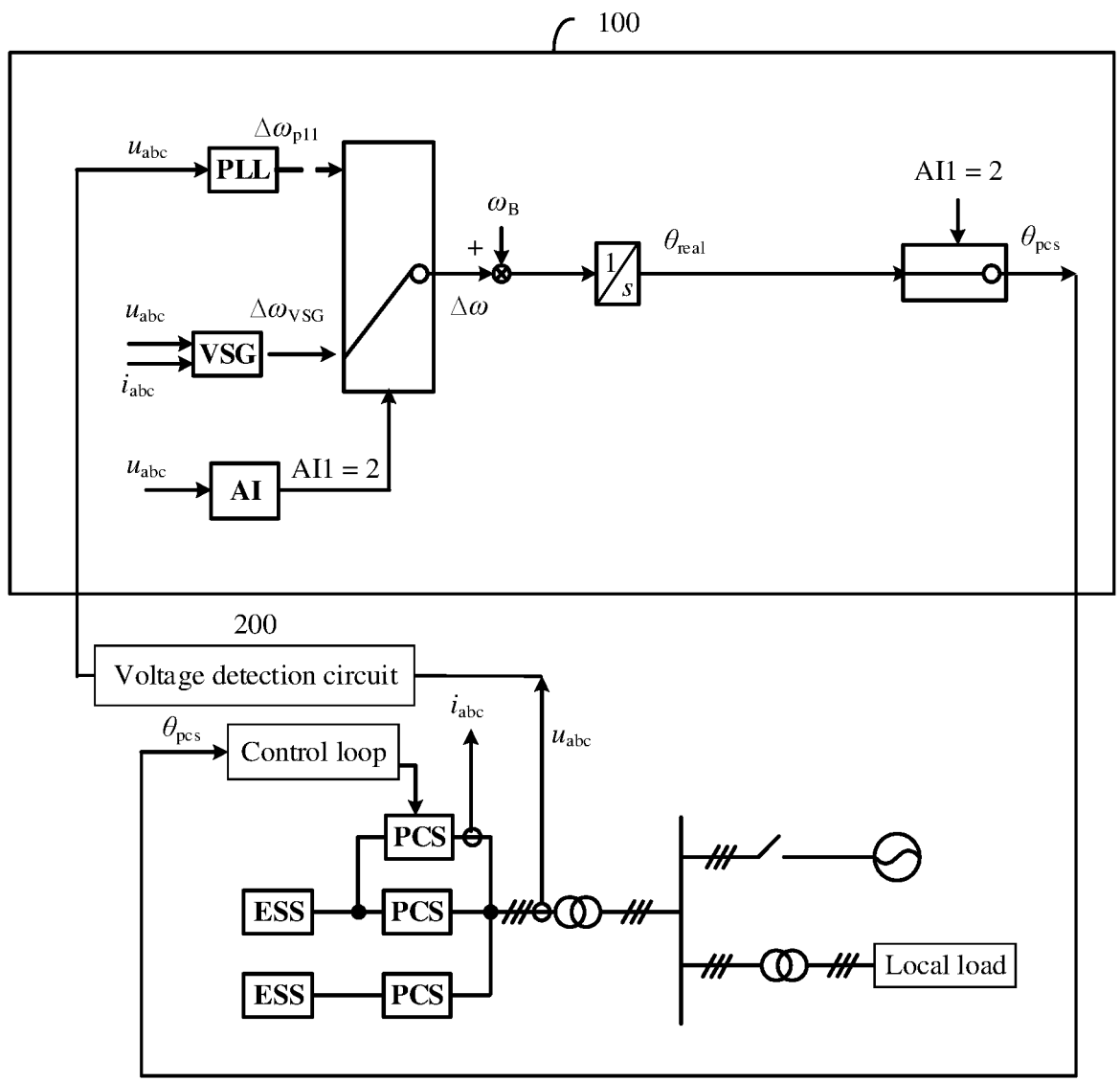
FIG. 7A is a schematic diagram of off-grid control after on/off-grid switching according to an embodiment.
Figure 7B:
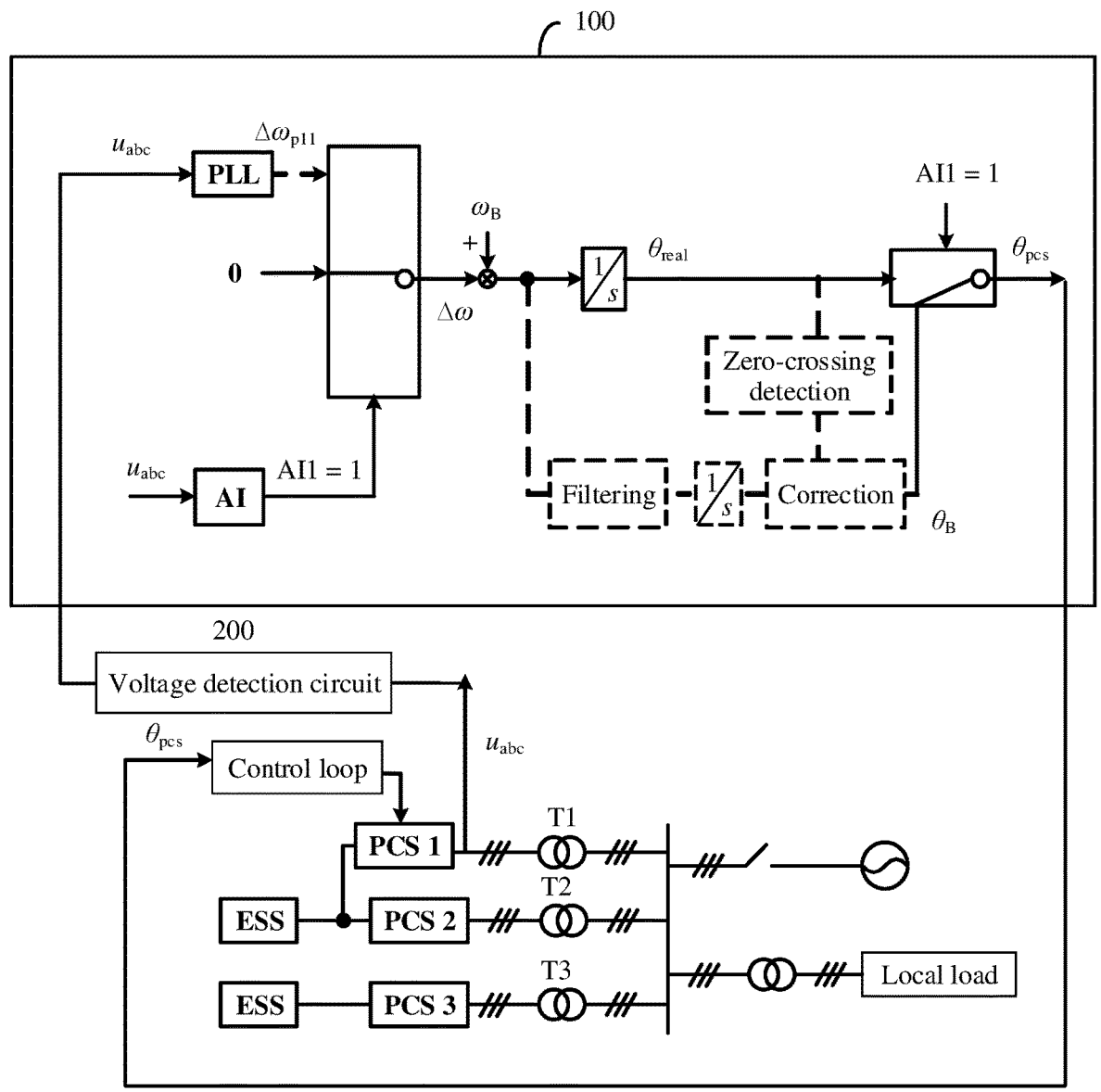
FIG. 7B is a schematic diagram of another energy storage system according to an embodiment.

FIG. 7 is a schematic diagram of off-grid control after on/off-grid switching according to an embodiment.

In the energy storage system provided in this embodiment, after making the angle of its own output voltage consistent with the reference angle, each PCS completes on/off-grid switching. In this case, the islanding flag bit AI1 is set to 2, and an off-grid voltage-controlled VSG implements control over the PCS, and each PCS equally divides power to supply power to the local load. It should be noted that, the angular frequency adjustment amount is no longer 0 in this case, and the angular frequency starts to change again. The off-grid voltage-controlled VSG outputs an angular frequency adjustment amount $\Delta\omega_{VSG}$ to perform off-grid control. That is, the controller is further configured to: when determining that a grid connection circuit breaker is disconnected, set the islanding flag bit AI1 to 2, and set an angular frequency adjustment amount based on a power angle characteristic, so that each PCS implements equal power division. The grid connection circuit breaker is connected between the parallel connection point and the alternating current power grid. It should be understood that, during off-grid control, in addition to an output voltage $u_{abc}$ of the PCS, the off-grid voltage-controlled VSG further needs an output current $i_{abc}$ of the PCS.

The energy storage system provided in this embodiment may collect the voltage at the parallel connection point of the power conversion systems in real time. In the on-grid state, the collected voltage signal passes through the phase-locked loop, to obtain the angular frequency adjustment amount. An output angle is obtained by performing integration on the angular frequency obtained based on the sum of the angular frequency adjustment amount and the reference angular frequency, and the output angle is input to the PCS control loop for on-grid control. In addition, filtering and integration are performed on the angular frequency, and then correction is performed to obtain the corrected reference angle. Because the plurality of PCSs may have a same parallel connection point, a reference angle of each PCS is the same. When it is determined that islanding occurs, the angular frequency adjustment amount is switched to 0, and in addition, the angle of the output voltage of each PCS is made consistent with the reference angle. After they are consistent, it is ensured that the angle of the output voltage of each PCS is the same, and then the angle is input to the PCS control loop for off-grid control.

In the energy storage system described in the foregoing embodiments, the output terminals of the PCSs are connected in parallel directly, and then are connected to the alternating current power grid through the transformer. In addition, the solutions for on/off-grid switching provided in the foregoing embodiments may be further applicable to a case that the output terminal of each PCS is connected to a first side of one corresponding transformer, and second sides of the transformers are connected in parallel, that is, connected to a parallel connection point.

FIG. 8A is a diagram of yet another control architecture of an energy storage system according to an embodiment.

In this embodiment, three PCSs are still used as an example for description, which are respectively a PCS 1, a PCS 2, and a PCS 3. An output terminal of the PCS 1 is connected to a first side of a first transformer T1, an output terminal of the PCS 2 is connected to a first side of a second transformer T2, and an output terminal of the PCS 3 is connected to a first side of a third transformer T3. A second side of T1, a second side of T2, and a second side of T3 are connected in parallel to connect to the alternating current power grid.

In FIG. 8A, the output terminal of each PCS is not directly connected together but is connected to an alternating current power grid through its own corresponding transformer. Therefore, a distance between each PCS and a parallel connection point may be different, a distance difference causes a different line impedance, and a generated voltage drop varies with the line impedance. Further, a power grid voltage detected by each PCS is different. As a result, an islanding moment of the power grid that is determined by each PCS is different. However, by using the embodiments, each PCS may obtain a reference angle. When islanding occurs, an angle of an output voltage of the PCS is made consistent with the reference angle. Therefore, even if it is determined that an islanding moment is different, no relatively large difference exists between the angles of the output voltages. Therefore, there is no relatively large cross current between the PCSs.

Method Embodiment

Based on the energy storage system provided in the foregoing embodiments, an embodiment may further provide an on/off-grid switching method for an energy storage system. The following describes the on/off-grid switching method in detail with reference to accompanying drawings.

Figure 8:
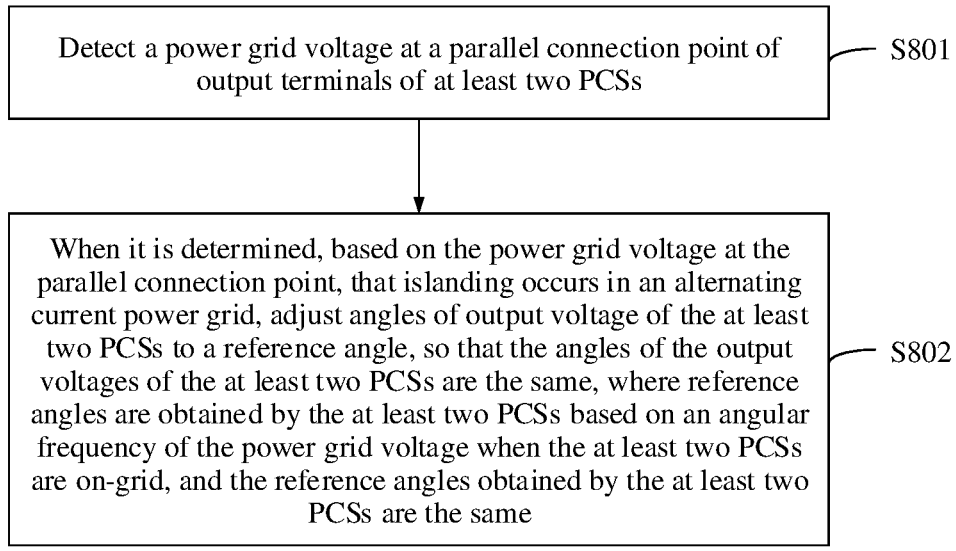
FIG. 8 is a flowchart of an on/off-grid switching method for an energy storage system according to an embodiment.

FIG. 8 is a flowchart of an on/off-grid switching method for an energy storage system according to an embodiment.

The on/off-grid switching method for an energy storage system provided in this embodiment is applied to an energy storage system. The energy storage system includes at least two power conversion systems PCSs, output terminals of the at least two PCSs are connected in parallel to connect to an alternating current power grid, and input terminals of the at least two PCSs are connected to an energy storage power supply. The method is applicable to a first PCS in the at least two PCSs, and the first PCS is any one of the at least two PCSs. The method includes the following steps.

S801. Detect a power grid voltage at a parallel connection point of the output terminals of the at least two PCSs.

The method is applicable to any PCS, and a controller of each PCS performs the same method. Each PCS may obtain the power grid voltage at the parallel connection point, to independently determine whether islanding occurs in the alternating current power grid.

S802. When it is determined, based on the power grid voltage at the parallel connection point, that islanding occurs in the alternating current power grid, adjust an angle of an output voltage of the first PCS to a reference angle, so that angles of output voltages of the at least two PCSs are the same, where the reference angle is obtained by the first PCS based on an angular frequency of the power grid voltage when the at least two PCS s are on-grid, and reference angles obtained by the at least two PCSs are the same.

If islanding occurs in the alternating current power grid, it indicates that the power grid is abnormal and cannot continue to normally supply power to a local load. In this case, the PCS is required to supply power to the local load. When the PCS operates on grid, the PCS is equivalent to a current source. When the PCS operates off grid, the PCS needs to be equivalent to a voltage source and provide electric energy for the local load.

When the PCS operates normally on grid, a controller of each PCS obtains an angular frequency in real time by performing phase locking on the power grid voltage. The reference angle is obtained based on the angular frequency. The reference angle has no effect when no islanding occurs in the power grid and plays a role only in an on/off-grid switching process.

Based on the method provided in this embodiment, when the power grid voltage is normal, each PCS operates normally on grid, and each PCS obtains the reference angle based on the angular frequency of the power grid voltage. When islanding occurs in the alternating current power grid, each PCS adjusts the angle of its own output voltage to the respective obtained reference angle. Because the reference angle obtained by each PCS is obtained by performing phase locking on the power grid voltage when the alternating current power grid is normal, the reference angle obtained by each PCS is the same. When islanding occurs, each PCS switches the angle of the output voltage to the reference angle, that is, the angle of the output voltage is made consistent with the reference angle. This ensures that the angle of the output voltage of each PCS is the same, thereby suppressing a relatively large cross current between the PCSs and ensuring that each PCS can supply stable power to the local load.

Figure 9:
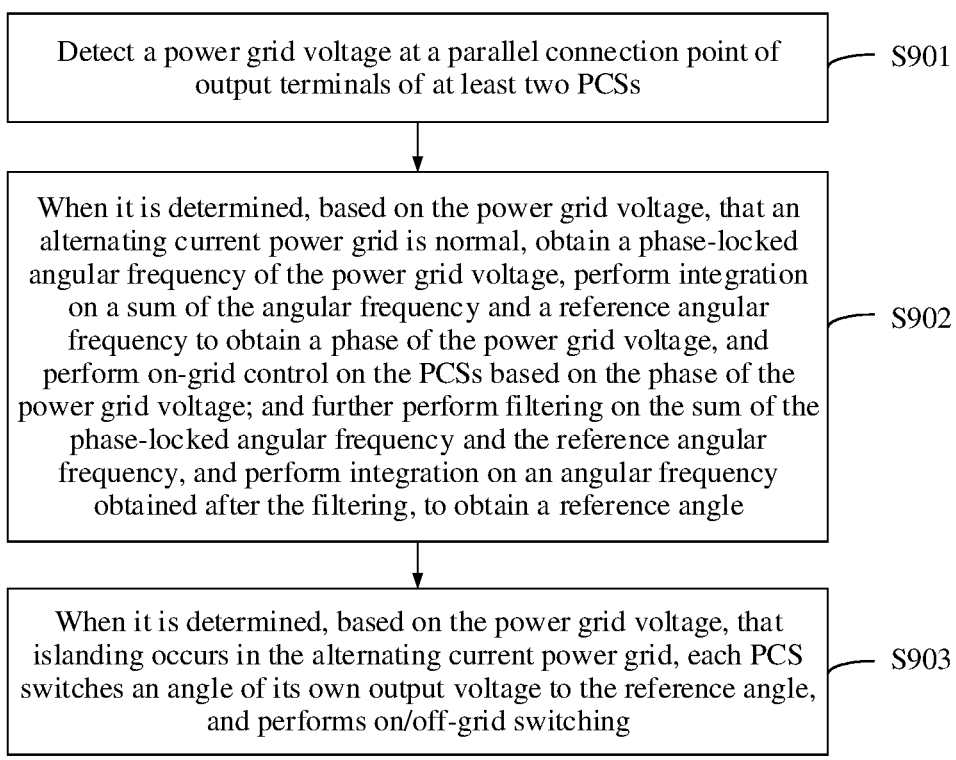
FIG. 9 is a flowchart of another on/off-grid switching method for an energy storage system according to an embodiment.

FIG. 9 is a flowchart of another on/off-grid switching method for an energy storage system according to an embodiment.

S901. Detect a power grid voltage at a parallel connection point of output terminals of at least two PCSs.

S902. When it is determined, based on the power grid voltage, that an alternating current power grid is normal, obtain a phase-locked angular frequency of the power grid voltage, perform integration on a sum of the angular frequency and a reference angular frequency to obtain a phase of the power grid voltage, and perform on-grid control on the PCSs based on the phase of the power grid voltage; and further perform filtering on the sum of the phase-locked angular frequency and the reference angular frequency, and perform integration on an angular frequency obtained after the filtering, to obtain a reference angle.

Filtering may alternatively be directly performed on the phase-locked angular frequency, summation is performed on an angular frequency obtained after the filtering and the reference angular frequency, and then integration is performed on an angular frequency obtained through the summation, to obtain the reference angle. For details, refer to the control architecture shown in FIG. 4A.

In addition, the angular frequency may be attenuated after the filtering, and an error may increase with time. The reference angle obtained after the integration may also have an error. Therefore, the reference angle may be corrected at a scheduled time to compensate for the error of the reference angle. The reference angle may be corrected by using the phase of the power grid voltage, and when islanding occurs in the alternating current power grid, an angle of an output voltage is adjusted to a corrected reference angle. A correction process may be as follows: The reference angle is zeroed out at a zero crossing point of the phase of the power grid voltage, and the corrected reference angle is obtained by re-performing filtering and then integration on the phase-locked angular frequency of the power grid voltage. The reference angle is zeroed out at each zero crossing point of the phase of the power grid voltage. Therefore, the reference angle is a periodic (0° to 360°) sawtooth wave, that is, an alternating current signal.

The angular frequency of the power grid voltage may be obtained as follows: Coordinate transformation is performed on the power grid voltage to obtain a Q-axis component in a rotating coordinate system, and phase locking is performed on the Q-axis component to obtain an angular frequency. The filtering may be low-pass filtering or sliding average filtering.

S903. When it is determined, based on the power grid voltage, that islanding occurs in the alternating current power grid, each PCS switches an angle of its own output voltage to the reference angle, and performs on/off-grid switching.

During a switching process, an angular frequency adjustment amount is 0, and the reference angle is directly zeroed out and corrected at a zero crossing point of a phase obtained after integration is performed on the reference angular frequency.

According to the method provided in this embodiment, the voltage at the parallel connection point of the power conversion systems may be collected in real time. In an on-grid state, the collected voltage signal passes through a phase-locked loop, to obtain the angular frequency adjustment amount. An output angle is obtained by performing integration on the angular frequency obtained based on a sum of the angular frequency adjustment amount and the reference angular frequency, and the output angle is input to a PCS control loop for on-grid control. In addition, filtering and integration are performed on the angular frequency, and then correction is performed to obtain the corrected reference angle. Because the plurality of PCSs may have a same parallel connection point, a reference angle of each PCS is the same. When it is determined that islanding occurs, the angular frequency adjustment amount is switched to 0, and in addition, the angle of the output voltage of each PCS is made consistent with the reference angle. After they are consistent, it is ensured that the angle of the output voltage of each PCS is the same, and then the angle is input to the PCS control loop for off-grid control.

Power Conversion System Embodiment

Based on the energy storage system and the on/off-grid switching method provided in the foregoing embodiments, an embodiment may further provide a power conversion system (PCS). The power conversion system is disposed in an energy storage system, and the energy storage system includes a plurality of PCSs. Output terminals of the plurality of PCSs are connected in parallel to connect to an alternating current power grid. When the alternating current power grid is normal, the plurality of PCSs operates normally on grid. However, when islanding occurs in the alternating current power grid, the plurality of PCSs may need to operate off grid to continue to supply power to a local load. However, because the plurality of PCSs may not simultaneously determine that islanding occurs, or moments at which the plurality of PCSs perform on/off-grid switching are different, angles of output voltages of the PCSs are different. In addition, the output terminals of the plurality of PCSs are connected in parallel. Consequently, a relatively large cross current occurs between the PCSs when the angles of the output voltages are different. For the PCSs provided in this embodiment, when operating normally, each PCS may obtain a reference angle based on a phase of a power grid voltage, and the reference angle obtained by each PCS may be the same. During on/off-grid switching, the angle is switched to the reference angle, so that the angles of the output voltages of the PCSs are the same reference angle. Therefore, a relatively large cross current can be suppressed in an on/off-grid switching process, and a stable voltage and current can be supplied to the local load. The PCS provided in this embodiment may be applicable to each PCS in the energy storage system. The following describes the PCS from a perspective of one PCS, and an on/off-grid control process of each PCS is the same.

With reference to an accompanying drawing, the following describes in detail the PCS provided in this embodiment.

Figure 10:
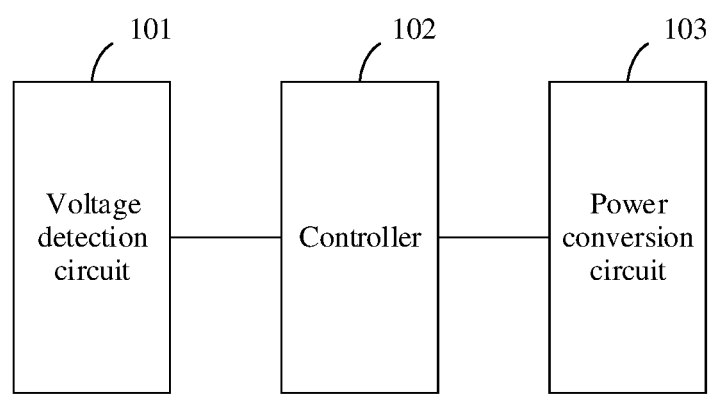
FIG. 10 is a schematic diagram of a power conversion system according to an embodiment.

FIG. 10 is a schematic diagram of a power conversion system according to an embodiment.

The power conversion system (PCS) provided in this embodiment may be a first PCS in at least two PCSs, the first PCS is any one of the at least two PCSs, and output terminals of the at least two PCSs are connected in parallel to connect to an alternating current power grid. The first PCS includes a voltage detection circuit 101, a power conversion circuit 102, and a controller 103.

The power conversion circuit 102 is configured to: convert, in an on-grid state under control by the controller 103, electric energy provided by an energy storage power supply, and output converted electric energy to the alternating current power grid.

The voltage detection circuit 101 is configured to detect a power grid voltage at a parallel connection point of the output terminals of the at least two PCSs.

An implementation of the voltage detection circuit 101 is not limited in this embodiment, for example, the voltage detection circuit 101 may be implemented by a voltage sensor or may be implemented by building a circuit.

The controller 103 is configured to: when determining, based on the power grid voltage at the parallel connection point, that islanding occurs in the alternating current power grid, adjust an angle of an output voltage of the first PCS to a reference angle, so that angles of output voltages of the at least two PCSs are the same, where the reference angle is obtained by the first PCS based on an angular frequency of the power grid voltage when the at least two PCSs are on grid, and reference angles obtained by the at least two PCSs are the same.

If islanding occurs in the alternating current power grid, it indicates that the power grid is abnormal and cannot continue to normally supply power to a local load. In this case, the PCS is required to supply power to the local load. When the PCS operates on grid, the PCS is equivalent to a current source. When the PCS operates off grid, the PCS needs to be equivalent to a voltage source and provide electric energy for the local load.

When the PCS operates normally on grid, a controller of each PCS obtains an angular frequency in real time by performing phase locking on the power grid voltage. The reference angle is obtained based on the angular frequency. The reference angle has no effect when no islanding occurs in the power grid and plays a role only in an on/off-grid switching process.

When the power grid voltage is normal, the PCS provided in this embodiment may obtain the reference angle based on the angular frequency of the power grid voltage. When islanding occurs in the alternating current power grid, the PCS adjusts the angle of its own output voltage to the respective obtained reference angle. Because the reference angle obtained by each PCS is obtained by performing phase locking on the power grid voltage when the alternating current power grid is normal, the reference angle obtained by each PCS is the same. When islanding occurs, each PCS switches the angle of the output voltage to the reference angle, that is, the angle of the output voltage is made consistent with the reference angle. This ensures that the angle of the output voltage of each PCS is the same, thereby suppressing a relatively large cross current between the PCSs and ensuring that each PCS can supply stable power to the local load.

It should be understood that, when islanding occurs in the alternating current power grid, electric energy output by the power conversion circuit 102 is no longer output to the alternating current power grid. Instead, off-grid power supply is performed for the local load, so that the local load can continue to operate stably.

The controller may be configured to: perform, in the on-grid state, coordinate transformation on the power grid voltage to obtain a Q-axis component in a rotating coordinate system, perform phase locking on the Q-axis component to obtain an angular frequency, perform low-pass filtering on a sum of the angular frequency and a reference angular frequency, and perform integration on an angular frequency obtained after the low-pass filtering to obtain the reference angle. It should be understood that filtering may alternatively be directly performed on the phase-locked angular frequency, summation is performed on an angular frequency obtained after the filtering and the reference angular frequency, and then integration is performed on an angular frequency obtained through the summation, to obtain the reference angle. For details, refer to the control architecture shown in FIG. 4A.

The controller may be configured to: when the at least two PCSs are on-grid, obtain the phase-locked angular frequency of the power grid voltage, perform integration on the sum of the angular frequency and the reference angular frequency to obtain a phase of the power grid voltage, and correct the reference angle by using the phase of the power grid voltage; and when islanding occurs in the alternating current power grid, adjust the angle of the output voltage to a corrected reference angle.

The controller may be configured to set the reference angle at a zero crossing point of the phase of the power grid voltage and obtain the corrected reference angle by re-performing filtering and then integration on the phase-locked angular frequency of the power grid voltage.

In addition, the angular frequency may be attenuated after the filtering, and an error may increase with time. The reference angle obtained after the integration may also have an error. Therefore, the reference angle may be corrected at a scheduled time to compensate for the error of the reference angle. The reference angle may be corrected by using the phase of the power grid voltage, and when islanding occurs in the alternating current power grid, the angle of the output voltage is adjusted to the corrected reference angle. A correction process may be as follows: The reference angle is zeroed out at a zero crossing point of the phase of the power grid voltage, and the corrected reference angle is obtained by re-performing filtering and then integration on the phase-locked angular frequency of the power grid voltage. The reference angle is zeroed out at each zero crossing point of the phase of the power grid voltage. Therefore, the reference angle is a periodic (0° to 360°) sawtooth wave, that is, an alternating current signal.

The angular frequency of the power grid voltage may be obtained as follows: Coordinate transformation is performed on the power grid voltage to obtain the Q-axis component in the rotating coordinate system, and phase locking is performed on the Q-axis component to obtain the angular frequency. The filtering may be low-pass filtering or sliding average filtering.

The PCS provided in this embodiment may collect the voltage at the parallel connection point of the power conversion systems in real time. In the on-grid state, the collected voltage signal passes through a phase-locked loop, to obtain an angular frequency adjustment amount. An output angle is obtained by performing integration on the angular frequency obtained based on a sum of the angular frequency adjustment amount and the reference angular frequency, and the output angle is input to a PCS control loop for on-grid control. In addition, filtering and integration are performed on the angular frequency, and then correction is performed to obtain the corrected reference angle. Because the plurality of PCSs may have a same parallel connection point, a reference angle of each PCS is the same. When it is determined that islanding occurs, the angular frequency adjustment amount is switched to 0, and in addition, the angle of the output voltage of each PCS is made consistent with the reference angle. After they are consistent, it is ensured that the angle of the output voltage of each PCS is the same, and then the angle is input to the PCS control loop for off-grid control.

"At least one (item)" refers to one or more, and "a plurality of" refers to two or more. "And/Or" is used to describe an association relationship between associated objects and indicates that three types of relationships may exist. For example, "A and/or B" may represent the following three cases: Only A exists, both A and B exist, and only B exists. A and B may be singular or plural. The character "/" generally indicates an "or" relationship between the associated objects. "At least one of the following items (pieces)" or a similar expression thereof indicates any combination of these items, including a single item (piece) or any combination of a plurality of items (pieces). For example, at least one of a, b, or c may indicate a, b, c, a and b, a and c, b and c, or a, b, and c, where a, b, and c may be singular or plural.

The foregoing description is merely an example embodiment rather than a limitation. Although the example embodiments are described above, the embodiments are not intended as limiting. By using the method and the content disclosed above, any person of ordinary skill in the art can make a plurality of possible changes and modifications, or amend the embodiments with equal effects through equivalent variations without departing from the scope of the embodiments. Therefore, any simple modifications, equivalent changes, and modifications made to the foregoing embodiments without departing from the content shall fall within the scope of the embodiments.

What is claimed is:

1. A power supply system, comprising at least two power conversion systems (PCSs), wherein output terminals of the at least two PCSs are connected in parallel to connect to an alternating current power grid, input terminals of the at least two PCSs are connected to an energy storage, each PCS of the at least two PCSs comprises a power conversion circuit, and the power conversion circuit is configured to:
   convert, in an on-grid state, electric energy provided by the energy storage power supply, and
   output converted electric energy to the alternating current power grid, wherein the power supply system further comprises a voltage detection circuit and a controller;
   the voltage detection circuit is configured to detect a power grid voltage at a parallel connection point of the output terminals of the at least two PCSs; and
   the controller is configured to:
   when determining, based on the power grid voltage at the parallel connection point, that islanding occurs in the alternating current power grid, adjust an angle of an output voltage of the first PCS to a reference angle, so that angles of output voltages of the at least two PCSs are the same, wherein the reference angle is obtained by the first PCS based on an angular frequency of the power grid voltage when the at least two PCSs are on-grid.

2. The power supply system according to claim 1, wherein the controller is further configured to
   obtain, when the at least two PCSs are on-grid, the reference angle by performing filtering and then integration on a phase-locked angular frequency of the power grid voltage.

3. The power supply system according to claim 2, wherein the controller is further configured to:
   perform, in the on-grid state, coordinate transformation on the power grid voltage to obtain a Q-axis component in a rotating coordinate system,
   perform phase locking on the Q-axis component to obtain an angular frequency,
   perform low-pass filtering on a sum of the angular frequency and a reference angular frequency, and
   perform integration on an angular frequency obtained after the low-pass filtering to obtain the reference angle.

4. The power supply system according to claim 2, wherein the controller is further configured to:
   when on-grid,
   perform coordinate transformation on the power grid voltage to obtain a Q-axis component in a rotating coordinate system,
   perform phase locking on the Q-axis component to obtain an angular frequency, perform low-pass filtering on the angular frequency, and
   perform integration on a sum of a reference angular frequency and an angular frequency obtained after the low-pass filtering to obtain the reference angle.

5. The power supply system according to claim 3, wherein the controller is further configured to:
   obtain a phase of the power grid voltage when the at least two PCSs are on-grid, and
   correct the reference angle by using the phase of the power grid voltage; and
   when islanding occurs in the alternating current power grid, adjust the angle of the output voltage to a corrected reference angle.

6. The power supply system according to claim 5, wherein the controller is further configured to:
   when the at least two PCSs are on-grid,
   obtain the phase-locked angular frequency of the power grid voltage, and
   perform integration on a sum of the angular frequency and the reference angular frequency to obtain the phase of the power grid voltage.

7. The energy storage system according to claim 5, wherein the controller is further configured to:
   zero out the reference angle at a zero crossing point of the phase of the power grid voltage, and
   obtain the corrected reference angle by re-performing filtering and then integration on the phase-locked angular frequency of the power grid voltage.

8. The power supply system according to claim 5, wherein the controller is further configured to:
   when the at least two PCSs are on-grid, use the phase of the power grid voltage as the angle of the output voltage of the first PCS.

9. The power supply system according to claim 1, wherein a waveform of the reference angle is a sawtooth wave, and an angle of the sawtooth wave varies from 0 degrees to 360 degrees with a sine wave.

10. The power supply system according to claim 1, wherein the controller is further configured to:
    detect a frequency or an amplitude of the power grid voltage at the parallel connection point, and
    when the frequency of the power grid voltage at the parallel connection point exceeds a preset frequency range or the amplitude of the power grid voltage at the parallel connection point exceeds a preset amplitude range, determine that islanding occurs in the alternating current power grid; and when determining that islanding occurs in the alternating current power grid, set an islanding flag bit to 1, and set an angular frequency adjustment amount to 0, and is further configured to:
    when determining that a grid connection circuit breaker is disconnected, set the islanding flag bit to 2, and set the angular frequency adjustment amount based on a power angle characteristic, so that each PCS implements equal power division, wherein the grid connection circuit breaker is connected between the parallel connection point and the alternating current power grid.

11. A power supply system comprising:
at least two power conversion system (PCS), each PCS comprising output terminals connected in parallel to connect to an alternating current power grid and an energy storage, each PCS further comprising a power conversion circuit, and the power supply system further comprising a voltage detection circuit and a controller, wherein the power conversion circuit is configured to:
convert, in an on-grid state, electric energy provided by an energy storage power supply, and output converted electric energy to the alternating current power grid;
the voltage detection circuit is configured to detect a power grid voltage at a parallel connection point of the output terminals of the at least two PCSs; and
the controller is configured to:
when determining, based on the power grid voltage at the parallel connection point, that islanding occurs in the alternating current power grid, adjust an angle of an output voltage of the PCS to a reference angle, so that angles of output voltages of the at least two PCSs are the same,
wherein the reference angle is obtained by the first PCS based on an angular frequency of the power grid voltage when the at least two PCSs are on-grid.

12. The power supply system according to claim 11, wherein the controller is further configured to:
perform, in the on-grid state, coordinate transformation on the power grid voltage to obtain a Q-axis component in a rotating coordinate system,
perform phase locking on the Q-axis component to obtain an angular frequency,
perform low-pass filtering on a sum of the angular frequency and a reference angular frequency, and
perform integration on an angular frequency obtained after the low-pass filtering to obtain the reference angle.

13. The power supply system according to claim 11, wherein the controller is further configured to:
when the at least two PCSs are on-grid,
obtain the phase-locked angular frequency of the power grid voltage,
perform integration on a sum of the angular frequency and the reference angular frequency to obtain a phase of the power grid voltage, and
correct the reference angle by using the phase of the power grid voltage; and
when islanding occurs in the alternating current power grid, adjust the angle of the output voltage to a corrected reference angle.

* * * * *